UNITED STATES PATENT OFFICE.

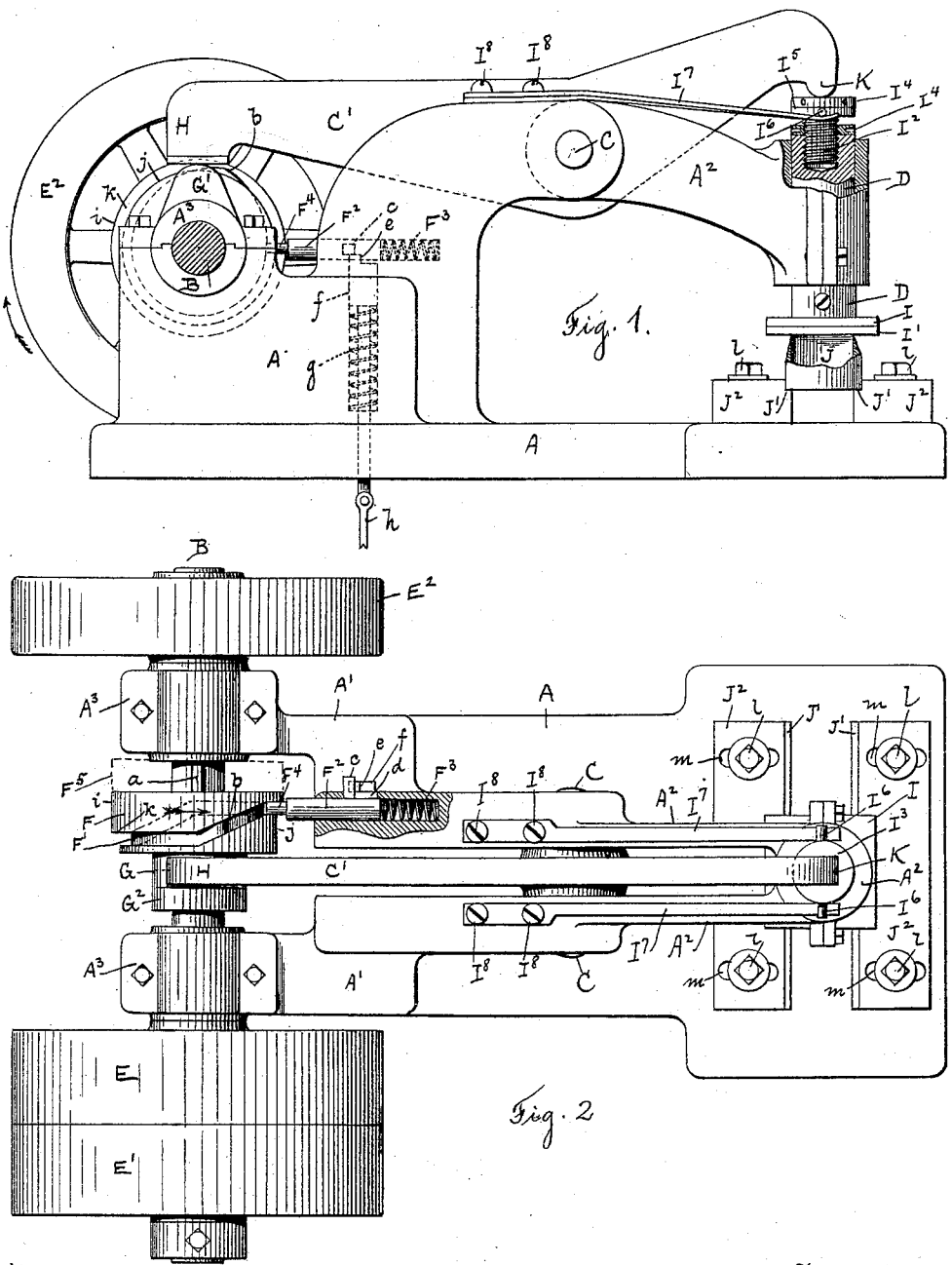

JAMES DANIEL COLOMY AND WILLIAM HENRY ALBEE, OF BROOKFIELD, MASSACHUSETTS.

DIE-PRESS.

SPECIFICATION forming part of Letters Patent No. 472,337, dated April 5, 1892.

Application filed December 24, 1891. Serial No. 416,096. (No model.)

*To all whom it may concern:*

Be it known that we, JAMES DANIEL COLOMY and WILLIAM HENRY ALBEE, citizens of the United States, residing at Brookfield, in the county of Worcester and State of Massachusetts, have invented certain new and useful Improvements in Die-Presses, of which the following is a specification, reference being had to the accompanying drawings, representing a machine embodying our invention, and in which—

Figure 1 represents a side view of the machine, a certain portion being shown in sectional view in order to disclose the method of adjusting the sliding plunger and a portion of the cutting-die having been broken away; and Fig. 2 is a top view of the machine with a portion of the supporting frame-work broken away in order to disclose the sliding spring-actuated pin which engages the operating-cam.

Similar letters refer to similar parts in the different figures.

Referring to the drawings, A denotes the supporting-bed upon which the frame-work is mounted, in the present instance being formed integrally with the bed and consisting of the blocks A', in which the main shaft B is journaled, and the arm $A^2$, supporting the trunnions C of the rocking lever C' and forming a bearing at its end for the vertically-sliding plunger D. The main shaft B carries the tight and loose pulleys E and E' and the balance-wheel $E^2$, and between the journal-bearings $A^3$ $A^3$ is a cam F, having a spline connection with the shaft B by the spline $a$ and capable of sliding longitudinally upon the shaft. The cam F is provided with a groove F', which is engaged by a pin $F^2$, held in the frame-work of the machine, but capable of a longitudinal sliding movement and having a spring $F^3$ held in a chamber in the frame-work with its tension applied to the inner end of the sliding pin $F^2$ to force it toward the cam and carry the end $F^4$ into the groove F'. The groove F' is so shaped that when it is engaged by the end $F^4$ of the sliding pin $F^2$ a reciprocating sliding motion is given to the cam F along the shaft B, alternately carrying the cam from the position shown in Fig. 2 to the position indicated by the broken lines $F^5$, Fig. 2, and back again. The bottom of the groove F' is eccentric for a portion of its circumference, forming a cam, so that as the point $b$, Fig. 1, passes the pin $F^2$ the pin will be pushed out of the groove F', compressing the spring $F^3$ and allowing the pin $o$, projecting from the side of the pin $F^2$ and sliding in the slot $d$, to be caught by the shoulder $e$ of the upwardly-sliding latch $f$, which is actuated by a spring $g$. (Indicated by broken lines in Fig. 1.)

G denotes the hub of the cam F, upon which is placed a wing G', which when the cam F is in the position shown in Fig. 2 is in the plane of the rocking lever C' and serves to actuate the same. The groove F', wing G', and the eccentric portion $b$ of the groove F' are all so arranged that they will act in the following order: The wing G' will be brought beneath the rocking lever C', raising the end H, and during the next quarter-revolution of the main shaft B the cam will be moved from the position shown in Fig. 2 to that indicated by the broken lines $F^5$, bringing the eccentric portion $b$ against the end of the sliding pin $F^2$ and pushing it out of the groove F' until the pin C is engaged by the latch $f$, so that the pin $F^2$ will be held out of engagement with the cam. This sliding movement of the cam F upon the shaft B carries the wing G' out of the plane of the rocking lever C', allowing the end H of the rocking lever to rest upon the cylindrical face $G^2$ of the hub G, so that the rotation of the shaft B and wing G' will not actuate the rocking lever. Connected with the latch $f$ is a pitman-rod $h$, connected at the floor with a treadle in the usual manner, but not shown in the drawings, whereby the latch $f$ is drawn downward, releasing the sliding pin $F^2$ and allowing the spring $F^3$ to carry the end $F^4$ of the pin $F^2$ into the cam-groove F' whenever the cam-groove is brought into suitable position by the rotation of the shaft B. The re-engagement of the cam-groove F' by the pin $F^2$ will cause the cam to be moved on the shaft B from the position $F^5$ to the position shown in Fig. 2, bringing the wing G' into the plane of the rocking lever C', when the action of the wing G', cam-groove F', and eccentric portion $b$, as already described, will be consecutively repeated. That portion of the cam F upon the side of the groove F' opposite the rocking lever C' is of greater diameter than that portion upon the side of the groove nearest the rocking lever C', so that the face $i$ projects radially beyond the face $j$ and acts as a flange, extending a short distance past the end $F^4$ of the sliding pin $F^2$, when the pin is withdrawn from the groove F', so that when the pin $F^2$ is released from the latch $f$ the end of the pin will bear against the edge $k$, holding the cam-groove F' in position to receive the pin as it is pushed by the spring $F^3$. In the free end of the arm $A^2$ is placed the vertically-sliding plunger D, the lower end of which is provided with a flanged head I, to the under side of which is attached a follower-plate I', which can be made of brass, copper, rawhide, or other material, and which will not turn the edge of the hollow steel cutting-die J, which rests upon the shoulders J' of the parallel bars $J^2$, adjustably attached to the bed A. The upper end of the plunger D is screw-threaded to receive a screw-threaded bolt $I^2$, having a head $I^3$ provided with holes to receive a spanner, by which the bolt $I^2$ is adjusted within the plunger D in order to vary the length of the plunger and determine the position of the plate I' with reference to the cutting-die J. The bolt $I^2$ is held in position by a check-nut $I^4$, and beneath the head $I^3$ is a washer $I^5$, provided with radially-projecting pins $I^6$, which rest upon the free ends of the blade-springs $I^7$, attached to the arm $A^2$ by screws $I^8$.

The operation of the machine is as follows: The article to be cut is placed upon the upper or cutting edge of the hollow die J. The latch $f$ is withdrawn, releasing the pin $F^2$, which is pushed against the cam F by the spring $F^3$, and as the cam F rotates the edge $k$, running against the end $F^4$ of the sliding pin, secures the proper relative position of the cam and serves as a guiding-wall to conduct the end of the pin into that portion of the groove F' rotating in the plane of the pin. As soon as the pin $F^2$ enters the cam-groove F' the cam by its continued rotation is moved longitudinally upon the shaft B, bringing it into the position represented in Fig. 2, so that the wing G' will be brought into the plane of the rocking lever C', causing the end H of the lever to be raised and push the plunger D downward, bringing the follower-plate $I^2$ in contact with the edge of the hollow die J and forcing the die through the article to be cut, the position of the operating parts when the follower-plate I' is in contact with the edge of the die J being represented in the accompanying drawings. The next quarter-revolution of the shaft B will carry the wing G' from under the end of the rocking lever, allowing the plunger D and end K of the lever to be raised by the action of the blade-springs $I^7$, the cam F is simultaneously moved into the position indicated by the broken lines, Fig. 5, and the pin $F^2$ is pushed out of the cam-groove F' by the action of the eccentric cam $b$, and the pin $F^2$ is again retained by the spring-actuated latch $f$. It will thus be seen that whenever the pin $F^2$ is released from the latch $f$ the next succeeding rotation of the shaft B will cause the cam F to be moved from the position $F^5$ to that represented in the accompanying drawings, the lever C' will be rocked, carrying the plunger D downward, and its motion reversed by the springs $I^7$, the cam F will be returned to the position $F^5$, and the pin $F^2$ will be pushed out of the groove F' and engaged by the latch $f$.

The lateral adjustment of the cutting-die J is secured by moving the die along the shoulders J', and its adjustment at right angles to the shoulders J' is effected by moving the bars $J^2$ upon the bolts $l$ by means of the slots $m$. The cutting-die J and follower-plate I' can be exchanged for any desired form of die and punch.

What we claim as our invention, and desire to secure by Letters Patent, is—

1. The combination, with a stationary die provided with a cutting-edge, of a reciprocating sliding plunger, a follower-plate carried by said sliding plunger, a rocking lever having one end operatively connected with said plunger, a rotating cam actuating the opposite end of said rocking lever, springs by which the motion of said plunger and said rocking lever as actuated by said rotating cam is reversed, and means of adjustment between said plunger and said rocking lever, whereby the downward movement of said follower-plate is limited, substantially as described.

2. The combination, with a sliding plunger and a bed supporting a die, of the die parallel bars resting on said bed and provided with shoulders upon which said die rests and upon which it is capable of lateral adjustment, said bars being provided with slots at right angles to said shoulders to receive attaching-bolts, and attaching-bolts by which said bars are attached to the bed, substantially as described.

3. The combination of a stationary die, a reciprocating plunger acting conjointly with said die, a rocking lever operatively connected with said plunger, a rotating shaft, and a cam carried on said shaft by which said rocking lever is actuated, said cam having a sliding motion on said shaft by which it is moved into engagement with said rocking lever, substantially as described.

4. The combination, with a stationary die and a plunger acting conjointly with said die, of a rocking lever operatively connected with said plunger, a rotating shaft, a cam carried on said shaft, provided with a wing by which said lever is actuated and having a cam-groove, and a pin held in the frame-work of the machine and engaging said cam-groove to slide the cam longitudinally on said shaft, substantially as described.

5. The combination, with a stationary die and a reciprocating plunger acting conjointly with said die, of an actuating-cam operatively connected with said plunger and provided with a cam-groove, a sliding pin held in the frame-work and arranged to engage said cam-groove, and a cam acting on said pin to push it out of engagement with said cam-groove, substantially as described.

6. The combination, with a reciprocating plunger, of a cam F, capable of a rotating and sliding motion, provided with a wing G', by which said plunger is actuated, and with a cam-groove F', cam b, sliding pin F², and a retaining-latch arranged to engage said pin, substantially as described.

7. The combination, with a reciprocating plunger, of an actuating-cam operatively connected with said plunger, a rotating shaft carrying said cam and having a spline connection therewith, and connected actuating mechanism by which said cam is moved longitudinally on said shaft, substantially as described.

8. The combination, with a reciprocating plunger, of a cam operatively connected with said plunger, a rotating shaft carrying said cam and having a spline connection therewith, said cam having a groove F', a sliding pin held in the frame-work, a spring applied to force said pin into the cam-groove, and a retaining-latch by which said pin is held against the tension of said spring, substantially as described.

Dated this 5th day of December, 1891.

JAMES DANIEL COLOMY.
WILLIAM HENRY ALBEE.

Witnesses:
RUFUS B. FOWLER,
EMMA KESTER.